United States Patent [19]

Hulman

[11] Patent Number: 5,367,242
[45] Date of Patent: Nov. 22, 1994

[54] SYSTEM FOR CHARGING A RECHARGEABLE BATTERY OF A PORTABLE UNIT IN A RACK

[75] Inventor: Fredericus W. M. Hulman, Deventer, Netherlands

[73] Assignee: Ericsson Radio Systems B.V., Va Emmen, Netherlands

[21] Appl. No.: 946,581

[22] Filed: Sep. 18, 1992

[30] Foreign Application Priority Data

Sep. 20, 1991 [NL] Netherlands ............. 9101590

[51] Int. Cl.$^5$ ............................................. H02J 7/04
[52] U.S. Cl. ...................................... 320/2; 320/21
[58] Field of Search ................... 320/2, 3, 4, 5, 22, 320/23, 24, 21, 39, 40

[56] References Cited

U.S. PATENT DOCUMENTS

| | | | |
|---|---|---|---|
| 3,808,538 | 4/1974 | Goransson et al. | 455/31.1 |
| 4,347,472 | 8/1982 | Lemelson | 320/2 |
| 4,496,896 | 1/1985 | Melocik et al. | 320/2 |
| 4,777,424 | 1/1988 | Sakamura et al. | 320/21 |
| 4,800,328 | 1/1989 | Bolger et al. | 320/2 |
| 5,070,293 | 12/1991 | Ishii et al. | 320/2 |

FOREIGN PATENT DOCUMENTS

| | | |
|---|---|---|
| 0385502 | 9/1990 | European Pat. Off. . |
| 9002677 | 12/1990 | Netherlands . |

Primary Examiner—Kristine L. Peckman
Attorney, Agent, or Firm—Burns, Doane, Swecker & Mathis

[57] ABSTRACT

A system for charging a rechargeable battery of a portable unit in a rack includes a detection circuit which detects the presence of the unit in the rack. The system has circuitry for transferring of energy from a supply circuit of the rack via a charging circuit of the unit to the battery. The transfer circuit is formed by an induction path which comprises a coil of the rack and a coil of the unit. The unit has a transmission circuit which, after placement of the unit in the rack, transmits a message via a wireless path, for example the induction path, to a control circuit of the rack, the control circuit being connected to the supply circuit. If the rack does not receive, or does not satisfactorily receive, a message expected upon placement of the unit in the rack, the control circuit controls the supply circuit so as to make the supply circuit select a higher transfer rate than normal for the purpose of transferring energy to the battery via the induction path. If the rack does receive a valid message, the normal transfer rate is selected unless the supply circuit receives a command to select a different rate. The portable unit may also have a detection circuit by which the unit may detect itself being placed in the rack and is then able to emit the message at its own initiative.

17 Claims, 5 Drawing Sheets

SYSTEM FOR CHARGING A RECHARGEABLE BATTERY OF A PORTABLE UNIT IN A RACK

BACKGROUND OF THE INVENTION

The invention relates to a system for charging a rechargeable battery of a portable unit in a rack, and more particularly to a system comprising a detection circuit which detects the presence of the unit in the rack, transfer means which are connected to a supply circuit of the rack and to a charging circuit of the unit and the battery, and which, after placement of the unit in the rack, charges the battery with energy from the supply circuit via the charging circuit, and a transmission circuit of the unit, which transmission circuit is connected to the battery and which, after placement of the unit in the rack, transmits a message via a wireless path to a control circuit of the rack.

Such a system is disclosed by the Dutch Patent Application 9002677, which was filed on Dec. 5, 1990 in the name of the Applicant and which, at the time of filing of the present application, had not yet been laid open for inspection by the public. This earlier described system is a presence detection system for detecting the presence of a portable transmission unit in a rack. The transmission means comprises a pair of contacts of the compartment of the rack which are connected to the supply circuit, and a pair of contacts of the portable unit which are connected to the charging circuit. The contacts are arranged in such a way that, if the unit is placed in the rack, a current passes via the contacts from the supply circuit to the battery for the purpose of charging the battery. In this earlier described system the detection circuit is a detection circuit of the portable unit and, in its simplest form, comprises a switch. After the detection circuit has detected the placement of the unit in the rack, the transmission circuit of the unit transmits a message to the control circuit of the rack. The wireless transmission path may be an induction path with a coil in the rack and a coil in the portable unit, which coils form an induction coupling after placement of the unit in the rack. The message contains an identification number assigned to the portable unit.

A system of the type mentioned in the preamble is also disclosed by the Dutch Patent Application 9001318, which was submitted on Jun. 11, 1990 in the name of Applicant and which corresponds to the U.S. patent application Ser. No. 711,904 filed on Jun. 7, 1991, now U.S. Pat. No. 5,194,856, and to the European Patent Application 91201255.6 filed on May 24, 1991. None of these three patent applications had been laid open for inspection by the public at the time of filing of the present application. This earlier described system is also a presence detection system for detecting the presence of a portable transmission unit in a compartment of a rack. In the case of this system, too, the transfer means comprises the same type of contacts in a similar arrangement as explained above. This earlier described system detects the presence of a portable unit in a compartment of the rack by emitting, by means of a transmission means, an interrogation or scanning signal from each compartment and by waiting for a response signal originating from any portable unit which may be present in the compartment, which response signal contains an identification number assigned to the unit. Emission of the scanning signal can take place sequentially, i.e. consecutively for all compartments, or whenever a presence detection means of a compartment, for example a switch, has detected a movement of a unit in the compartment. Here also, the wireless transmission path for the response signal may be an induction path.

The earlier described systems have the drawback that the charging of a battery of a portable unit via the contacts will not always proceed satisfactorily, for example, because the contacts may be dirty and/or the unit has not been properly placed in the rack and the contacts are not touching each other. Furthermore, the fitting of contacts of this type, in particular to the housing of a portable unit, is fairly inconvenient and expensive. Furthermore, the charging rate is fixed, and thus independent of the state of a battery to be charged. Therefore, it is always necessary to choose a safe, relatively slow charging rate. Consequently, it is possible that at the time when the portable unit is removed from the rack, the battery will be insufficiently recharged for relatively long subsequent usage.

SUMMARY OF THE INVENTION

The object of the invention is to overcome the drawbacks of the earlier described systems.

In accordance with the invention, this object is achieved in that the transfer means for charging the battery comprising an induction path with a coil in the rack and a coil in the portable unit. The coils form an induction coupling after placement of the unit in the rack. The induction path is coupled to both the supply circuit of the rack and to the battery of the unit, so that the energy for charging the battery is transferred via the induction path. A control circuit is connected to the supply circuit. The rack also has a detection circuit connected to the supply circuit and the control circuit for the purpose of detecting the presence of the unit in the rack. If the control circuit does not receive a valid message from the unit after placement of the unit in the rack, it controls the supply circuit so that energy is transferred to the battery at a higher rate than normal.

The invention can be used in both of the earlier described systems mentioned above, in which a portable unit may or may not have a detection circuit of its own for detecting the presence of the unit in the rack, and therefore may or may not emit a message on its own initiative upon placement of the unit in the rack.

Also in accordance with the invention, a single wireless path, namely the induction path, may be used both to emit the message from the portable unit to the rack and to transfer energy for the purpose of charging the battery of the portable unit, so that no contacts at all of the abovementioned type are necessary. Because of this, the construction of the rack and of the portable unit can be simpler and their cost price lower.

Because the control circuit expects a message after placement of the portable unit in the rack, which message may have been sent by the unit on its own initiative or in response to an interrogation signal emitted by the rack, the control circuit, if it does not receive the expected message or does not receive a valid message, may interpret this as am indication that the battery unit is insufficiently charged to emit the message. In such a case, the control circuit may decide to charge the battery at a higher rate than normal. In this way it is possible to ensure more effectively that the battery is charged up as highly as possible while the unit is in the rack.

The battery is charged at the normal rate upon the control circuit's reception of a valid message, in so far as no other rate has been requested from the unit by means of the message and/or if the control circuit does not select another rate depending on the circumstances.

BRIEF DESCRIPTION OF THE DRAWINGS

These and other properties and advantages of the invention will become clear after reading the following explanation with reference to the drawings of embodiments of the system according to the invention. In the drawings.

DETAILED DESCRIPTION OF PREFERRED EMBODIMENTS

Figure 1:
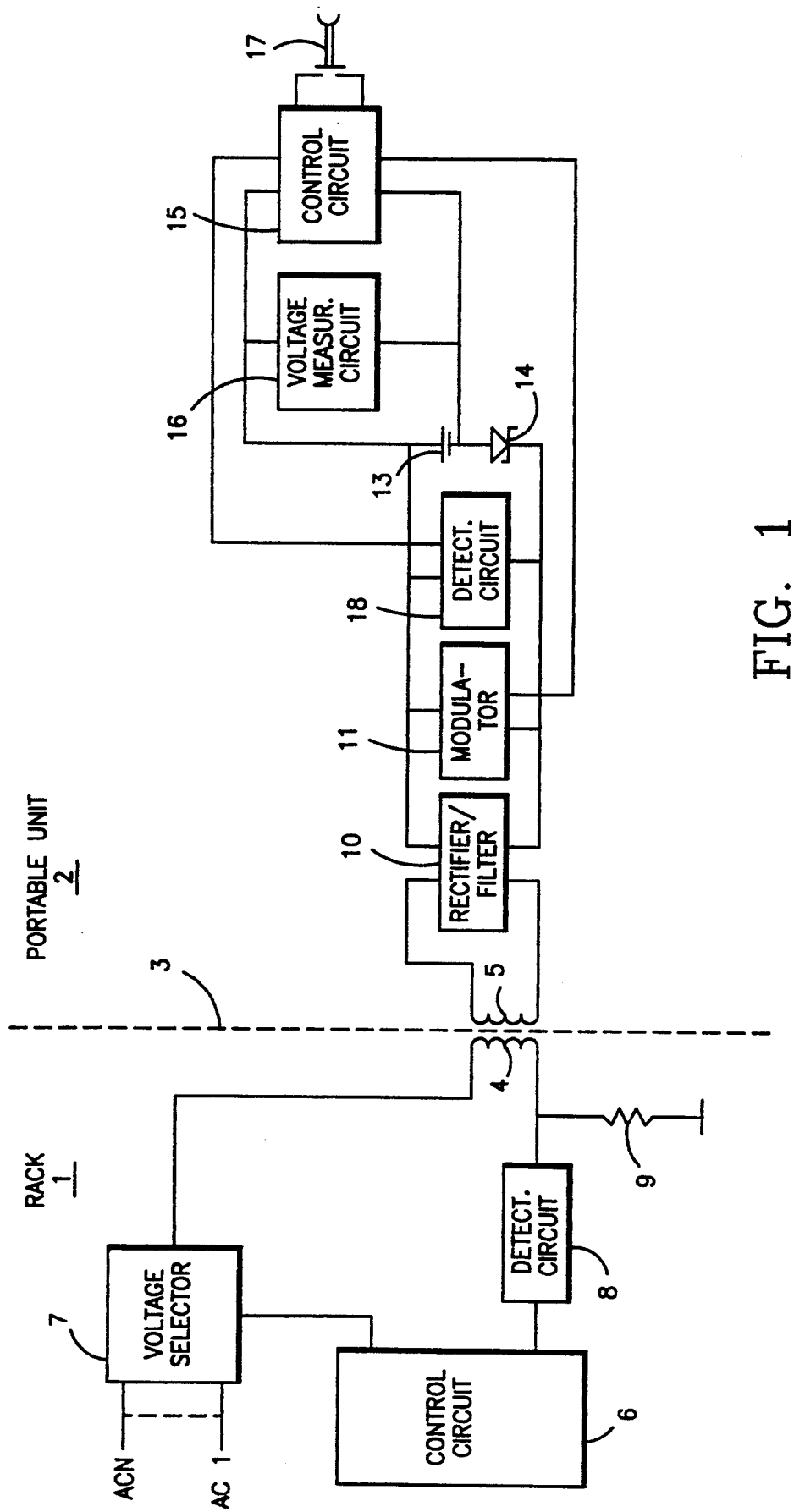
FIG. 1 shows a block diagram of a first embodiment of the system according to the invention.

FIG. 1 shows a simple embodiment of the system according to the invention. The system comprises a rack 1 and a portable unit 2, which are shown to the left and to the right, respectively, of the vertical dashed line 3. The rack 1 has a coil 4 and the portable unit has a coil 5. When the portable unit 2 is placed in the rack 1, in general in a compartment (not shown) of the rack 1, the coils 4 and 5 form an induction coupling for the transmission of energy, by way of induction, from the coil 4 to the coil 5.

The rack 1 furthermore has a control circuit 6, which is connected to a voltage selector 7 and a detection circuit 8. The voltage selector 7 has a plurality of inputs, which receive at least two alternating voltages AC1 ... ACN, and an output which is connected to the coil 4 and which, depending on a control signal delivered by the control circuit 6 to the voltage selector 7, delivers one of the alternating voltages AC1 ... ACN to the coil 4. The coil 4 is also connected to the detection circuit 8 and to a resistor 9, in order to detect the loading of coil 4 and, consequently the presence of the portable unit 2 in the rack 1, with the coil 5 situated in the vicinity of the coil 4.

The coil 5 of the portable unit 2 is connected to a rectifying/filter circuit 10 which is connected to a modulator 11 and to a rechargeable battery 13 in series with a diode 14, wherein the diode 14 is connected so as to pass a direct current from the rectifying/filter circuit 10 via the battery 13. A control circuit 15 and a voltage measuring circuit 16 are connected in parallel with the battery 13. Connected to the control circuit 15, there is a switch, for example a pushbutton switch, 17 whose function will be explained later. An output of the control circuit 15 is connected to an input of the modulator 11.

Connected to the outputs of the rectifying/filter circuit 10, there is also a detection circuit 18. An output of the detection circuit 18 is connected to an input of the control circuit 15.

Detection circuits 8 and 18 serve to detect the presence of the portable unit 2 in the rack 1. In a simplest embodiment they comprise a switch which switches over upon movement of the portable unit 2 into or out of the rack 1. The connection between the detection circuit 8 and the coil 4 is then omitted, and instead of the resistor 9 a through-connection can be used. The connections of the detection circuit 18 to a rectifying/filter circuit 10 can then also be omitted. In the embodiment shown, the detection circuits 8 and 18 detect a voltage change.

If coil 5 is in the vicinity of coil 4, coil 4 will generate an alternating magnetic field in coil 5 which generates an alternating voltage across coil 5, thereby generating a direct voltage across the outputs of the rectifying/filter circuit 10. When the detection circuit 18 detects a voltage, it delivers a detection signal to the control circuit 15, which in response thereto, delivers a modulation signal to the modulator 11 for the purpose of modulating the direct voltage by loading it to a greater or lesser extent, as a result of which the alternating voltage across the coil 5 is loaded to a greater or lesser extent, and consequently the voltage across the resistor 9 changes in accordance with the modulation signal delivered to the modulator 11, this being detected by the detection circuit 8 and signalled to the control circuit 6.

If the portable unit 2 is placed in the rack 1, but the unit 2 for whatever reason does not transmit a message by modulating the alternating voltage across the coil 5, the coil 5 and the rest of the circuit of the portable unit 2 connected to said coil will still form a load for the coil 4, as a result of which the voltage over the resistor 9 changes, and consequently the detection circuit 8 is able to detect the placement (and the removal) of the portable unit 2 in the rack 1 and can signal said placement or removal to the control circuit 6.

The message, which is contained in the modulation signal that is delivered to a modulator 11 and which is delivered to the control circuit 6 via the induction path containing the coils 4 and 5, may contain an identification number assigned to the portable unit, as in the presence detection system disclosed by the abovementioned Dutch Patent Application 9001318. This is not, however, necessary for the application of the invention.

The message may also contain a diagnosis indicating the condition of the battery 13, for which purpose the voltage measurement circuit 16 measures the voltage of the battery 13 and delivers the measurement result to the control circuit 15 for determining the diagnosis. The diagnosis is used, as is explained below, for the selection of an energy transfer rate between the coils 4 and 5. The diagnosis may take the form of a value of the voltage of the battery 13, but it may also specify an energy transfer rate demanded by the portable unit 2, which rate may be selected from a range of rates which are assigned to ranges of values of the voltage of the battery 13.

In addition, the diagnosis may be generated by a user of the portable unit 2 by activating one or more switches, such as the pushbutton switch 17, for the purpose of selecting a charging rate for the battery 13.

If the detection circuit 8 detects placement of the portable unit 2 in the rack 1, but does not receive a message from the unit 2 and reports this to the control circuit 6, the control circuit 6 will interpret this in terms of the battery 13 of the unit 2 having been insufficiently charged to activate one or more of the circuits 11, 15, 16 and 18. The control circuit 6 will then control the voltage selector 7 so as to make the selector deliver a higher voltage at its output, as a result of which the field generated by coil 4 becomes stronger and more energy can be transferred per time unit. In order to prevent damage to the battery 13 when it is charged at a high rate for too long, the control circuit 6 monitors the time during which the higher alternating voltage has been delivered to coil 4. After a given time, the control circuit 6 controls the voltage selector 7 so as to make the selector deliver a lower alternating voltage, which is also understood to include a voltage with value zero, at its output. In a practical embodiment of the portable unit as receiver unit of a paging system, the given time may, for example, be fourteen hours.

In another embodiment, the control circuit 6 may control the voltage selector 7 so as to make the selector change its output voltage in stepwise fashion, each output voltage being maintained during a given time.

If the detection circuit 8 has detected the placement of portable unit 2 in the rack 1 and has subsequently received a message from the unit 2 and passed said message on to control circuit 6, the control circuit 6 controls the voltage selector 7 so as to make the selector deliver at its output an alternating voltage having an amplitude which is chosen so that the battery 13 is charged at a "normal" rate.

As explained earlier, according to the main characteristic of the invention, it is not necessary for the message to contain a diagnosis of the condition of the battery 13 and/or a required charging rate. If the message does contain such a diagnosis, the control circuit 6 controls the voltage selector 7 accordingly, possibly by changing the magnitude of the alternating voltage delivered by the selector 7 in steps, applying each voltage for a predetermined length of time.

The portable unit 2 may be equipped for transmitting the message more than once after placement of the unit 2 in the rack 1.

Figure 2:
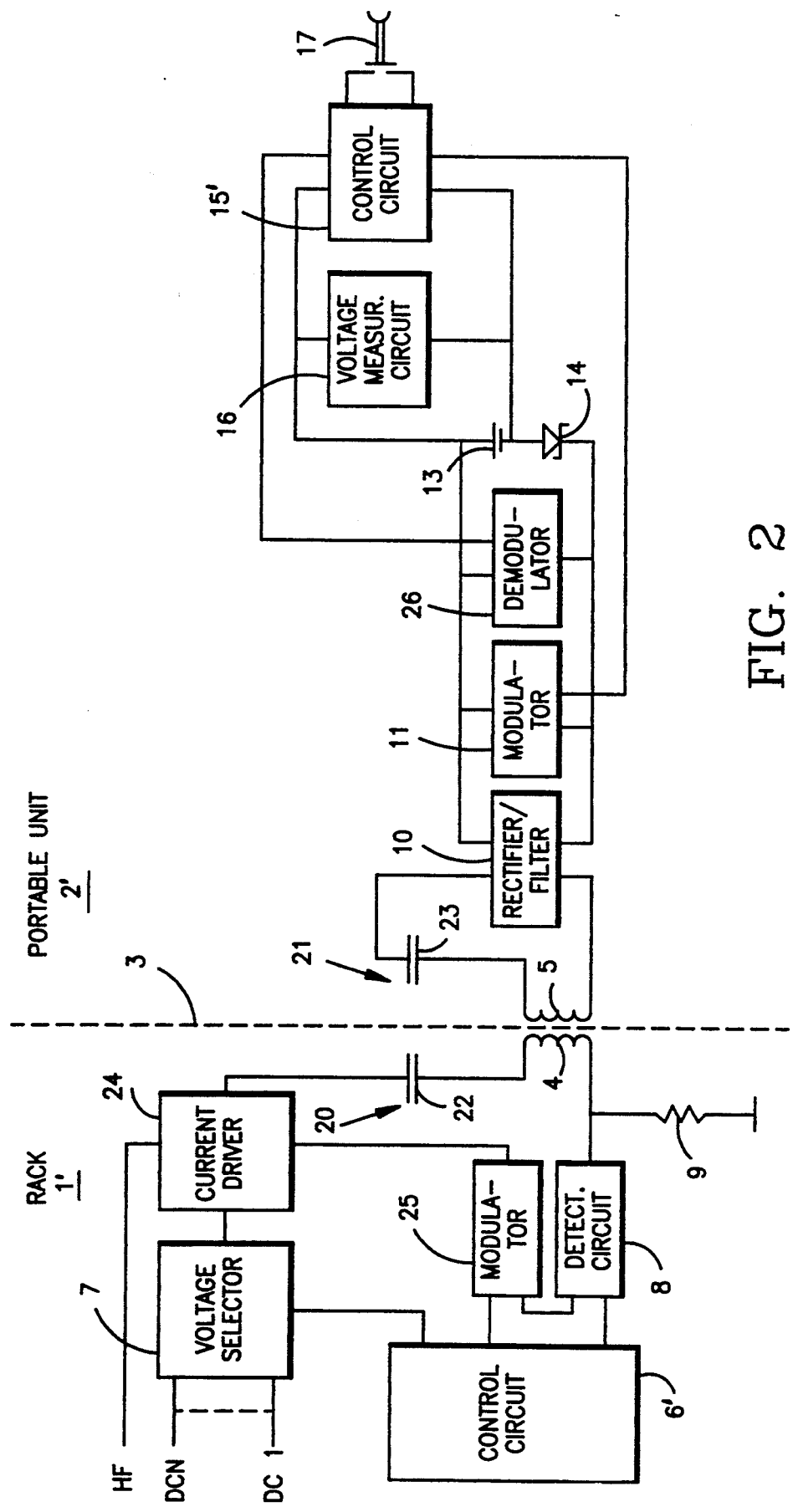
FIG. 2 shows a block diagram of another embodiment of the system according to the invention.

FIG. 2 shows a block diagram of another embodiment of the system according to the invention, which is very similar to the embodiment shown in FIG. 1.

In the system of FIG. 2, the coils 4 and 5 are each a coil of a series-resonant circuit 20 and 21, respectively, with a capacitor 22 and 23, respectively. In this case, the voltage selector 7 receives at its input a plurality of direct voltages DC1 . . . DCN and delivers a selected direct voltage to a current driver 24 which also receives a high-frequency supply signal HF whose amplitude is limited by the direct voltage received from selector 7. An output of the current driver 24 supplies the resonant circuit 20. The resonant circuits 20 and 21 are both tuned to the frequency of the high-frequency supply signal HF, for example 138 kHz. The high-frequency supply signal HF may have a rectangular shape.

The use of the resonant circuits 20 and 21 instead of the single coils 4 and 5, respectively, has the advantage that the inductive path containing the coils 4 and 5 is much less sensitive to interference signals having frequencies differing from the frequency to which the resonant circuits 20 and 21 are tuned.

If the resonant circuits 20 and 21 are used, the so-called kQ factor is important, where k represents the coupling between the coils 4 and 5 and Q represents the quality factor of the circuit. If no portable unit 2' is placed in the rack 1', the coupling k=0, as a result of which the current through the coil 4 will be higher than in the case were the unit 2' has indeed been placed in the rack 1', with a coupling k≠0. When the unit 2' is placed in the rack 1', the voltage across the resistor 9 decreases.

If the resonant circuit 21 is short-circuited by the modulator 11 to a greater extent than in the case where the modulator 11 does not receive a modulation signal, the quality Q of the resonant circuit 21 will increase, which results in a greater kQ factor of the resonant circuit 21, and this results in the quality Q of the resonant circuit 20 decreasing, as a result of which the current through the coil 4 will consequently decrease, resulting in a decrease in the voltage across the resistor 9. The rack 1' also has a modulator 25, which is controlled by the control circuit 6', for the purpose of modulating the current delivered by the current driver 24 to the resonant circuit 20. As explained later, the modulator 25 may comprise a transistor which, depending on a modulation signal received from the control circuit 6', may or may not short-circuit the output of the current driver 24.

Instead of the detection circuit 18 of the portable unit 2 of FIG. 1, the portable unit 2' has a demodulator 26 whose construction does not have to be very different from that of the detection circuit 18. When the rack 1' transmits, upon reception of a modulation signal by the modulator 25, a message to a placed unit 2' placed in the rack via the induction path containing the coils 4 and 5, this can be detected by the demodulator 26 and delivered to the control circuit 15'. The message delivered by the rack 1' to the portable unit 2' may contain any type of information and need not relate to the operation of the system according to the invention. Apart from the ability to transfer a message from the rack 1' to the portable unit 2', the system according to FIG. 2 can, therefore, function in the same way as the system according to FIG. 1. The control circuit 15' of the portable unit 2' may however be equipped for emitting, in response to the reception of a message from the rack 1', a message by delivering a modulation signal to the modulator 11. The control circuit 6' may be equipped to expect, in response to a message emitted by rack 1', a message from the portable unit 2' and, if the message expected from the unit 2' is not received, to control voltage selector 7 in such a way that a higher direct voltage is delivered at the selector output, as a result of which the high-frequency signal in the resonant circuit 20 can run at a higher current in order to generate a stronger high-frequency field in order to charge the battery 13 more quickly than if a message from the unit 2' had indeed been received back.

The current intensity through the coil 4 of the rack 1' of the system of FIG. 2 can be selected in the same way as in the system of FIG. 1, inter alia by the possible inclusion of said diagnosis in a message which the unit 2' emits to the rack 1'.

In both systems of FIGS. 1 and 2, the rack 1 and 1', respectively, may be designed in such a way that, if no portable unit 2 or 2', respectively, has been placed, a lower current is passed through the coil 4 than that passing through coil 4 when the battery 13 is charged at a "normal" rate. This limits the energy consumption of the rack, in particular when the rack has a plurality of similar compartments, in each of which a portable unit may be placed, and the portable units are not placed in the rack for long periods of time. Additionally, undesirable heating of the coil 4 and unnecessary radiation of high-frequency energy to the environment and any consequent interference with other equipment are prevented.

Instead of selecting a minimum voltage, for example DC1, in order to pass a minimum current through the coil 4 if no unit 2' is placed in the rack 1', the detection circuit 8 may be connected to the modulator 25 to control the current driver 24 in such a way that the current through the resonant circuit 20 is limited, but limited to a lesser extent than upon reception of a modulation signal from the control circuit 6'.

Limiting the current through the coil 4 is particularly important in the system of FIG. 2 because, as explained, the current through the coil 4 is highest if no unit 2' has been placed and therefore the undesirable radiation and heating of the coil 4 will be higher than in the system of FIG. 1.

It is pointed out that the control circuits 6, 6', 15 and 15', are control circuits which are known per se, which comprise, for example, a microprocessor and which only need to be suitably programmed for the purpose of the functions required in the application of the invention. The required program steps are considered to be within the scope of a person skilled in the art who has read the above. Nevertheless, an operation of the system according to the invention will be explained separately below with reference to a flow diagram shown in FIG. 6.

Figure 3:
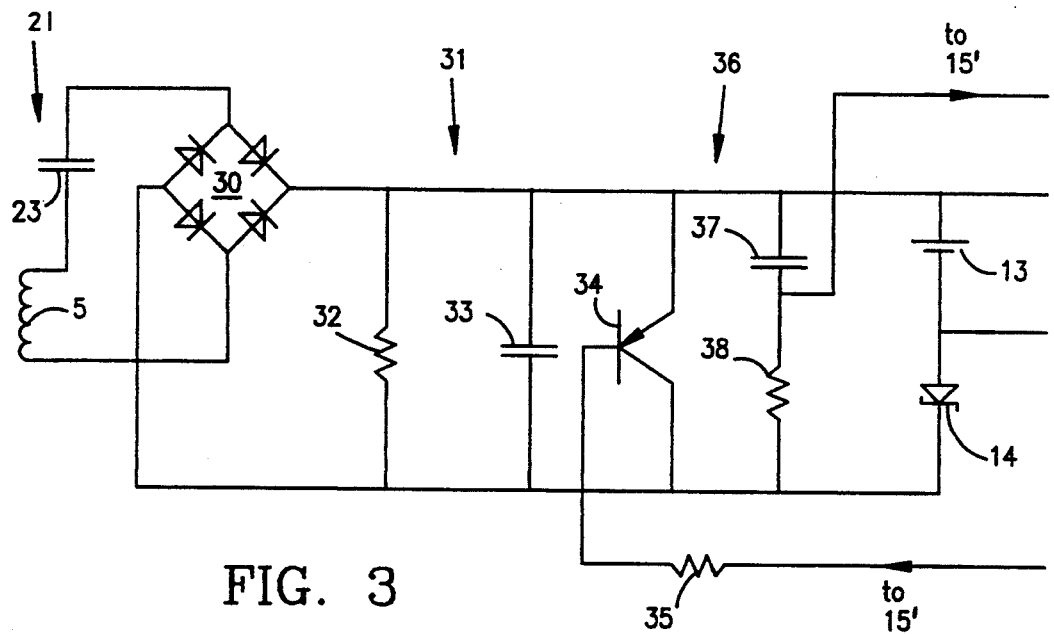
FIG. 3 shows a detailed section of the diagram of the portable unit of FIG. 2.

FIG. 3 shows a more detailed diagram of a section of the portable unit 2' of FIG. 2. A rectifying/filter circuit 10 is formed by a bridge rectifier 30 consisting of 4 diodes whose alternating voltage terminals are connected to the terminals of the resonant circuit 21 and whose direct voltage terminals are connected to a lowpass filter 31 comprising a resistor 32 and a capacitor 33 in parallel with said resistor. The time constant of the filter 31 is greater than the period of the high-frequency signal HF, but less than the bit time of a message to be transferred via the induction path. If, as mentioned earlier as an example, the frequency of the signal HF is 138 kHz (period 38 $\mu$s), the bit time is 417 $\mu$s (2400 baud), the time constant of the filter 31 is, for example, 7.2 $\mu$s and the resistor 32 may have a value of 56 k$\Omega$ and the capacitor 33 a value of 680 pF.

The modulator 11 is represented by a pnp transistor 34 whose emitter and collector are connected to the direct voltage terminals of the bridge 30 and whose base may receive, via a resistor 35, a modulation signal from the control circuit 15'.

The demodulator 26 is represented by a series circuit which comprises a capacitor 37 and a resistor 38 and is connected to the direct voltage terminals of the bridge 30 and whose central interconnection point is connected to an input of the control circuit 15' and at which the data of a message which may have been received from the rack 1' are available.

The abovementioned diode 14 is preferably a Schottky diode having a low threshold voltage (0.3 V), which enables as large a proportion as possible of the energy transferred via the induction path containing the coils 4 and 5 to be stored in the battery 13.

Figure 4:
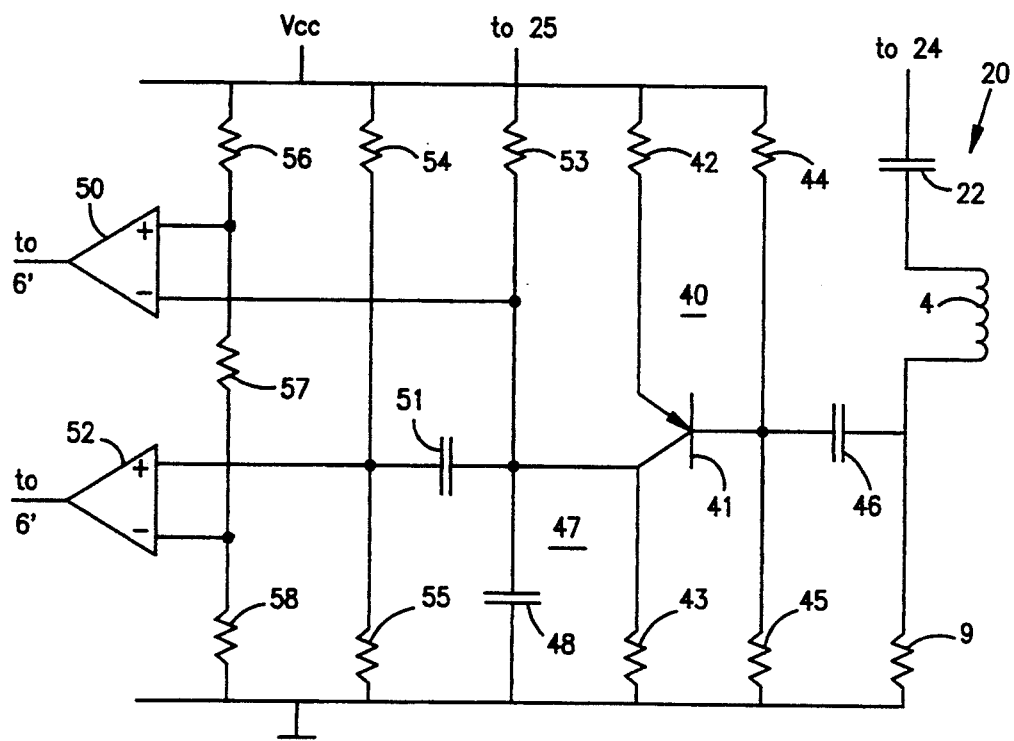
FIG. 4 shows a detailed section of the diagram of the rack of FIG. 2.

FIG. 4 shows a more detailed diagram of a section of the rack 1' of FIG. 2. The diagram of FIG. 4 comprises a class C amplifier 40, comprising a pnp transistor 41 and resistors 42 to 45 inclusive. The emitter of transistor 41 is connected to a direct voltage Vcc via a resistor 42. The collector of transistor 41 is grounded via a resistor 43. The base of transistor 41 is connected, via resistors 44 and 45, to Vcc and ground, respectively, and via a capacitor 46 to the interconnection point of the coil 4 and the resistor 9. The amplifier 40 forms a rectifier for the alternating voltage signal across resistor 9. The rectified signal is filtered by a filter 47 comprising the resistor 43 and a capacitor 48 in parallel with the resistor 43. The time constant of the filter 47 is greater than the period of the high-frequency signal HF, but less than the bit time of a message transferred via the induction path containing the coils 4 and 5. The time constant of the filter 47 may therefore be equal to the time constant of the filter 31 of FIG. 3. The output of the filter 47 (the collector of the transistor 41) is connected to the inverting input of a first comparator 50, and is connected via a capacitor 51 to the non-inverting input of a second comparator 52. The inverting input of the comparator 50 is also connected, via a resistor 53, to the modulator 25 in order to limit the current through the coil 4 if no unit 2' is placed in the rack 1', as explained above and as will be explained below with reference to FIG. 5. The non-inverting input of the comparator 52 is connected to Vcc via a resistor 54 and to ground via a resistor 55, for the purpose of setting this input. Connected between Vcc and ground is a voltage divider, comprising the resistors 56, 57 and 58 connected in series, in the direction from Vcc to ground. The interconnection point of the resistors 56 and 57 is connected to the non-inverting input of the comparator 50. The interconnection point of the resistors 57 and 58 is connected to the inverting input of the comparator 52. The series connection of the resistors 56, 57 and 58 delivers reference voltages to the comparators 50 and 52.

The outputs of the comparators 50 and 52 are connected to the control circuit 6'.

If no portable unit 2' is present in the rack 1', a greater high-frequency current will pass through the resistor 9, the base of transistor 41 will receive a greater alternating voltage, and a higher direct voltage will be produced at the collector of transistor 41 than if a unit 2' has indeed been placed in the rack 1', in which case the voltage at the collector of transistor 41 is lower. The reference voltage at the non-inverting input of the comparator 50 lies between these two voltages at the collector of transistor 41. Consequently, if no portable unit 2' has been placed in the rack 1', the output of the comparator 50 will be low and, if a portable unit 2' has indeed been placed in the rack 1', the output of the comparator 50 will be high.

The data signal, which is superimposed on the voltage at the collector of transistor 41 if a message is received from a unit 2' placed in the rack 1, is decoupled by the capacitor 51, superimposed on a predetermined direct voltage, and subsequently compared with a reference voltage via the comparator 52. The output of the comparator 52 delivers a data signal of rectangular shape.

Figure 5:
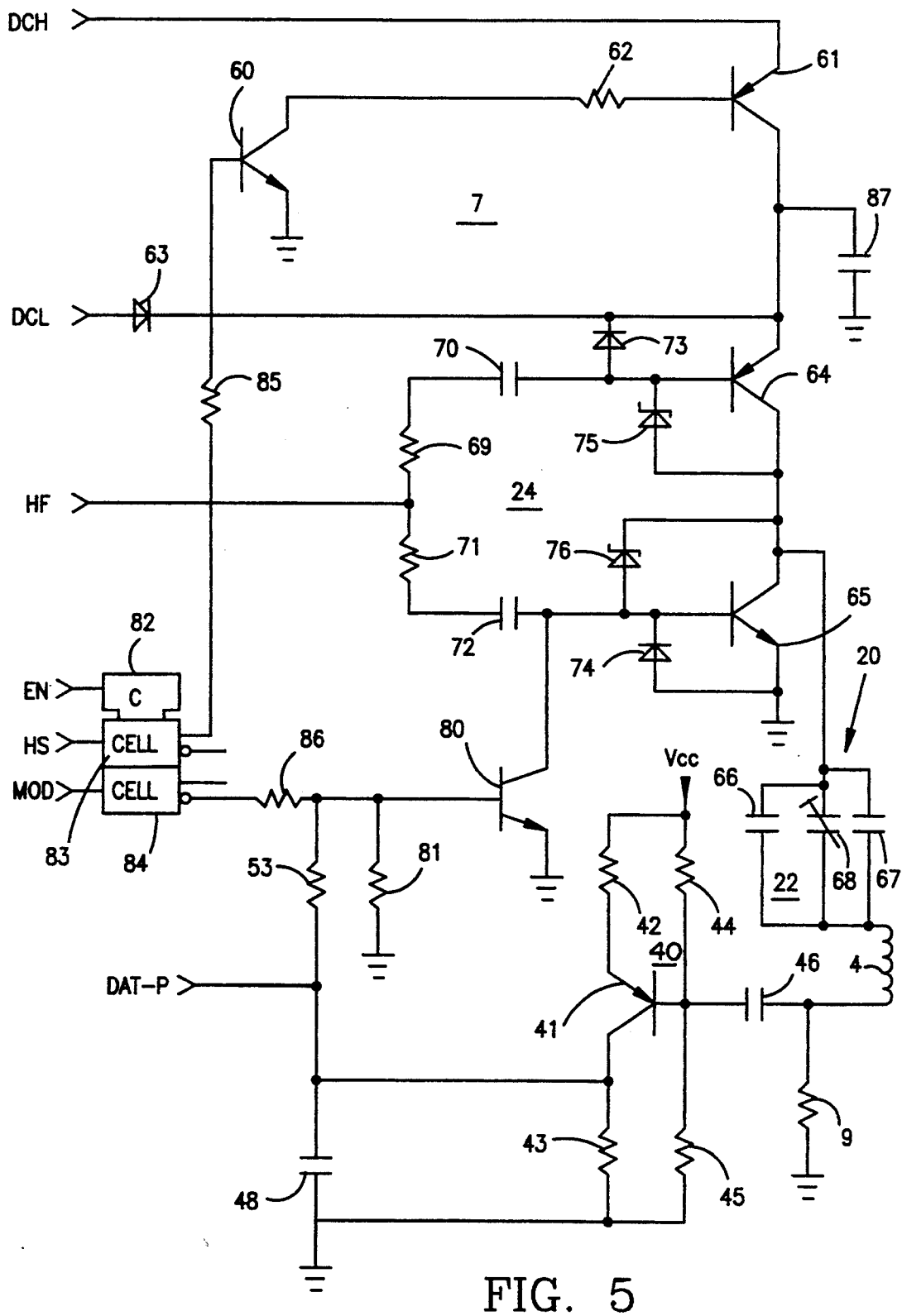
FIG. 5 shows a detailed diagram of a section of the rack of FIG. 2 intended for each of a number of compartments of the rack when a multiple connection to a common section of the rest of the circuits of the rack is used.

FIG. 5 shows a more detailed diagram of a section of the rack 1' of FIG. 2. The section shown in FIG. 5 can be used for each compartment if the rack 1' has a plurality of similar compartments.

The circuit shown in FIG. 5 receives two direct voltages DCi for the voltage selector 7, specifically a relatively high direct voltage DCH and a lower direct voltage DCL. The voltage selector 7 comprises an npn transistor 60 and pnp transistor 61, a resistor 62 which is connected between the collector of transistor 60 and the base of transistor 61, and a diode 63 between the DCL terminal and the collector of transistor 61, which diode prevents a current from passing in the direction of the DCL terminal. The emitter of transistor 60 is grounded and the emitter of transistor 61 is connected to the DCH terminal. The collector of transistor 61 delivers the supply voltage, which is limited by DCH or DCL, and is connected to an input of the current driver 24, specifically the emitter of a pnp transistor 64.

The current driver comprises, in addition to the transistor 64, an npn transistor 65 whose collector is connected to the collector of transistor 64 and to the capacitor 22 of the resonant circuit 20. The capacitor 22, in FIG. 5, is a composite capacitor comprising two capacitors 66 and 67 having a fixed value and an adjustable capacitor 68 which is used to tune the resonant circuit 20 to the frequency of the high-frequency signal HF, which is delivered to the base of transistor 64 via a resistor 69 in series with a capacitor 70, and which is delivered to the base of transistor 65 via a resistor 71 in series with a capacitor 72. The capacitors 70 and 72 prevent both the transistors 64 and 65 from conducting simultaneously during a zero passage of the signal HF by biasing the base-emitter junction of the transistors 64 and 65 negatively.

Connected in parallel to the base-emitter junction of each transistor 64 and 65 are normally non-conducting diodes 73 and 74, respectively, which limit the negative voltages on the bases of the transistors 64 and 65.

Connected in parallel with the base-collector junctions of the transistors 64 and 65 are Schottky-diodes 75 and 76, respectively, which prevent transistors 64 and 65, respectively, from saturating, thus enabling them to switch more rapidly.

The modulator 25 comprises an npn transistor 80, whose collector is connected to the base of the transistor 65 and whose emitter is grounded. The base of the transistor 80 is grounded via a resistor 81 and is connected to the detection circuit 47 via the resistor 53 mentioned in the explanation of FIG. 4.

The circuit of FIG. 5 also comprises a transparent buffer ("transparent latch") 82, which may be one of the buffers of an integrated circuit of the type 74HC75. A clock input C of the buffer 82 receives an enabling signal EN from the control circuit 6', in particular via a decoder (not shown) addressed by the control circuit 6'. Other outputs of said decoder may be connected to other buffers 82 of circuits similar to that of FIG. 5, each circuit as shown in FIG. 5 being assigned to a separate compartment of a plurality of similar compartments of a rack 1'in which a portable unit 2' can be placed.

A cell 83 of the buffer 82 receives a signal HS which indicates whether the battery 13 of a placed unit 2' does or does not have to be charged at a high rate.

A data input of another cell 84 of the buffer 82 receives a modulation signal MOD from the modulator 25.

A non-inverting output of the cell 83 of the buffer 82 is connected to the base of transistor 60 of the voltage selector 7 via a resistor 85.

An inverting output of the cell 84 is connected to the base of transistor 80 of the modulator 25 via a resistor 86.

A capacitor 87 between ground and the connection between the voltage selector 7 and the current driver 24 provides for any required attenuation of the direct voltage delivered to current driver 24 when the transistor 61 switches.

The output of the filter 47 (the collector of transistor 41), which has already been explained by reference to FIG. 4, delivers a signal DAT-P which is delivered, via a demultiplexer (not shown) addressed by the control circuit 6', to the remainder of the circuit 50 to 58 inclusive of the circuit of FIG. 4. This section 50 to 58 inclusive of FIG. 4 may therefore be common to said number of compartments of the rack 1'.

If the buffer 82 is addressed by the control circuit 6' via the said decoder (not shown) as a result of the signal EN becoming high, the levels of the signals HS and MOD at the data inputs of the cells 83 and 84 will be transferred to the outputs of said cells. If the signal EN returns to a low value, the levels which have been transferred are maintained at the outputs of the buffer 82.

If the non-inverting output of the cell 83 is high, because HS was high during said transfer of the levels, transistor 60 will conduct, as a result of which transistor 61 will also conduct and the voltage at the emitter of transistor 64 is determined and limited by the direct voltage DCH. If the non-inverting output of the cell 83 is low, transistor 60 will not conduct, nor will transistor 61 conduct, as a result of which the voltage at the emitter of transistor 64 is determined and limited by the direct voltage DCL. The arrangement of the voltage limiter 7 with the transistor 60 and 61 is designed in this way because the voltage DCH in a practical embodiment is about 11 V, which is higher than the voltage of 5 V used for the high logical level. The voltage DCL in the practical embodiment was about 6 V.

The transistors 64 and 65 will, with the frequency of the signal HF, alternately conduct and not conduct, the current passing in each case through a transistor 64, 65 being limited by the voltage selected at the emitter of transistor 64. This current also passes through the resonant circuit 20, so that the strength of the field generated in the coil 4 can be selected by selecting the voltage at the emitter of transistor 64.

If the inverting output of the cell 84 of the buffer 82 is high, because during said transfer of the levels MOD was low, transistor 80 will conduct, as a result of which the base of transistor 65 will become low and transistor 65 will not conduct, thus making resonance in the circuit 20 impossible.

If, as explained with reference to FIG. 4, no portable unit 2' has been placed in the rack 1', the rectified voltage at the collector of transistor 41 will be relatively high, as a result of which transistor 80 will conduct to a predetermined extent, which is lower than if the inverting output of cell 84 of buffer 82 is high during modulation, with the result that transistor 65 will be less conductive and the current through the coil 4 is limited. As has already been said with reference to FIG. 4, this prevents the coil 4 from generating an undesirably strong field, which could interfere with apparatuses outside the system, and also prevents an unnecessarily large amount of energy from being consumed if no unit 2' is placed in the rack 1', and prevents the coil 4 from reaching an undesirably high temperature.

Figure 6:
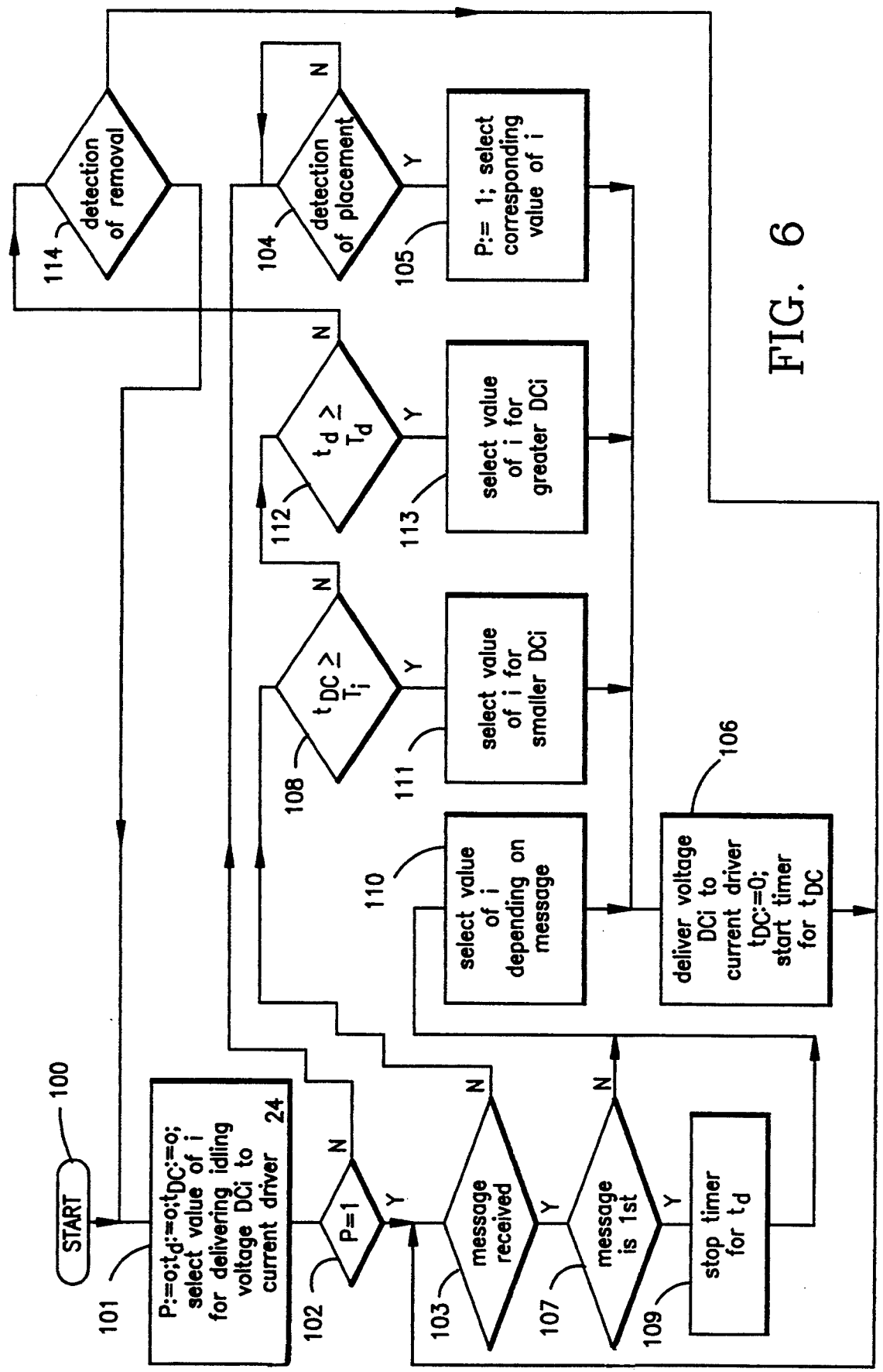
FIG. 6 shows a flow diagram of an operation of a system according to the invention.

Even though after reading the above a practical implementation by a person skilled in the art is not considered difficult, there follows an additional explanation of a function of a system according to the invention with reference to a flow chart shown in FIG. 6. The diagram shows the operation of the control circuit 6' of the rack 1' of the system of FIG. 2, in so far as it relates to the invention. The voltage DCi indicates the output voltage of the voltage selector 7 which has been selected from the various voltages DC1 to DCN inclusive. The diagram however also applies to the system of FIG. 1, in which case it is only necessary to replace the letters DC by the letters AC, and the voltage ACi is then obviously not delivered to the current driver 20 but directly to the coil 4.

In the flow chart of FIG. 6 "Y" represents an answer "YES" to a question put in an adjacent box and "N" represents and answer "NO" to that question.

After start up of the rack 1', indicated by the word "START" in box 100, the control circuit 6 first carries out the tasks listed in box 101. These tasks comprise initialising a number of variables. A variable P is set to 0 if the control circuit 6 has detected no portable unit 2' in the rack 1' (or in a selected compartment of said rack). If P has the value 1, this indicates that the control circuit 6 did detect a portable unit 2' in the rack 1' (or in the selected compartment).

Furthermore, according to box 101, the time counter variable $t_d$ is set to 0. If a clock has been started for this variable, this variable indicates the time elapsed from the moment of detection of a portable unit 2' in the rack 1' to the moment when a valid message has been received from the unit 2'.

According to box 101 a time counter variable $t_{DC}$ is also set to 0. If a clock has been started for this variable, the latter indicates the time during which a selected voltage DC has been delivered to the current driver 24 by the voltage selector 7.

According to box 101, the control circuit 6 furthermore selects a value for a selection variable i used to address the voltage selector 7 which is such that the voltage selector 7 delivers a predetermined rest voltage DCi to the current driver 24. As explained above, the rest voltage DCi may be the lowest possible voltage of the voltages DC1 to DCN inclusive. As has also been explained, the selected voltage DCi may, however, also be a higher voltage than the lowest voltage.

The box 101 is followed by a decision box 102. If the control circuit 6 has earlier detected a unit 2' in the rack 1' (or in the selected compartment of said rack), that is to say if P=1, according to box 102, the process continues with box 103, or else the box 104 is returned to. If the presence of a unit 2' has not yet been detected, according to box 104, after detection of the placement of a unit 2' in the rack 1', the process continues with box 105 or else is returned to the box 104, which means that the control circuit 6' continues to wait for such a detection, for which purpose it will receive a signal from the detecting circuit 8.

According to box 105 the placement detection variable P is set to 1 and a value of i corresponding to the event of the detection of the placement is selected. The selected value of i is to be used for the selection of a voltage DCi for the current driver 24, for the purpose of charging a battery 13 of the unit 2' at a "normal" rate. As mentioned earlier, and also during the explanation of box 101, the voltage DC for the purpose of charging at "normal" rate may, within the context of the invention, be either higher or lower than the voltage DCi selected in box 101. The process subsequently continues with box 106.

According to box 106, the voltage selector 7 delivers a voltage DCi to the current driver 24, the time counter variable $t_{DC}$ is set to 0, and the clock for this variable is started. Subsequently, the process continues with decision box 103 although, to the same effect, it could also go to box 102.

If, according to box 103, a valid message has been received from the portable unit 2' placed in the rack 1', the process continues with decision box 107, or else with decision box 108. If, according to box 107, the message received is the first message of the unit 2' after said unit has been placed, the process continues with box 10, or else with box 110. According to box 109, the control circuit 6' stops the clock for the time counter variable $t_d$. Subsequently, the process again goes to box 110.

The received message may, as explained earlier, initiate a change of the rate at which the battery 13 is charged, which change is effected by delivering a different voltage DC to the current driver 24, i.e. by selecting a different value of i. The selection may, as explained earlier, be encoded in the message received and may in this case have been determined by a user of the unit 2', by activating switches, such as the pushbutton switch 17, or by a voltage, measured by the voltage measuring circuit 16, of the battery 13.

If, according to box 108, the time counter variable $t_{DC}$ is greater than a predetermined maximum value $T_i$ which may be different for each i selected, the process continues with box 111, or else with decision box 112.

If the answer to the question $t_{DC} \geq T_i$ was "Y" (YES), this means that the battery 13 had been charged during the period $T_i$ at an appropriate rate determined by the voltage DCi. To prevent damage to the battery 13, a lower charging rate may be selected subsequently, according to box 111, by selecting a lower DCi. Depending on the situation, the voltage DCi may be 0 V. Following this procedure, the charging rate may be lowered in a stepwise fashion, spread over time.

If, according to box 112, after detection of the placement of a unit 2' in the rack 1', the time variable $t_d$ has become greater than or equal to a maximum time $T_d$ without a message having been received, this is interpreted by the control circuit 6' in terms of the battery 13 of the unit 2' having been insufficiently charged for the unit 2' to be able to emit a message. In this situation, the control circuit 6', according to box 113, selects a higher voltage DCi for the current driver 24, and thus a higher charging rate.

After each of the boxes 111 and 113, the process continues with box 106, which has already been explained.

If the answer to each of the questions of the boxes 103, 108 and 112 was "N" (NO), the process continues with box 114. If, according to box 114, the control circuit 6' detects that the unit 2' placed in the rack 1' is being removed, or has been removed, while the value of P is still 1, the process returns to the initialisation box 101. Otherwise the process returns to box 103, which means that the situation is static, with a unit 2' having been placed in the rack 1' and only the clock or clocks for the time variables $t_{DC}$ and/or $t_d$ running. In the other static state, if no unit 2' has been placed in the rack 1', only the question in box 104 is monitored, as stated earlier.

Though the invention is described hereinbefore for embodiments in which a single induction path as wireless transmission path is used both to transmit a message between the portable unit and the rack and to transfer energy for charging the battery of the portable unit several induction paths can be used for any transmission of a message in any direction between the portable unit and the rack and for said energy transfer. Moreover other types of wireless paths can be used, such as an optical transmission path, in particular for transmission of a message from the portable unit to the rack. With reference to FIG. 1 this only requires that instead of modulator 11 a light emitting device is used, which receives a modulating signal from the control circuit 15, and which is arranged towards the outside of the portable unit so that, if the portable unit is placed in the rack, light emitted by said light emitting device is received by a light sensitive device of the rack, in which a signal received by said light sensitive device can be demodulated in a well-known manner and subsequently used in the same way as a message received by the rack from the portable unit 2 in the system of FIG. 1. A message to be sent from the rack 1' to the portable unit 2' as described with reference to FIG. 2 can be established in a similar way by providing a second optical path with a light transmitting device in rack 1' and a light sensitive device in portable unit 2' instead of demodulator 26.

I claim:

1. In a system including a rack and a portable unit that includes a rechargeable battery, an apparatus for charging the rechargeable battery comprising:
   a supply circuit located in the rack and having an input connected to a power source and an output, the supply circuit supplying energy alternatively at least at a normal rate or at a higher than normal rate in response to a control signal;
   a detection circuit located in the rack and coupled to the supply circuit for detecting the presence of the portable unit in the rack and generating a signal indicative thereof;
   transfer means for communicating messages between the portable unit and the rack;
   a rack control circuit coupled to receive the signal from the detection circuit and the messages from the transfer means, and generating the control signal at an output that is connected to a control input of the supply circuit;
   a charging circuit located in the portable unit and connected to the rechargeable battery to supply energy thereto during a rechargeable operation; and
   transmission circuit in the portable unit and connected to the rechargeable battery and to the transfer means for transmitting a message to the rack control circuit indicative of the presence of the portable unit in the rack;
   wherein said transfer means, connected to the supply circuit in the rack and to the charging circuit in the portable unit, conveys energy from the supply circuit to charging circuit, comprising a first coil located in the rack and coupled to receive energy from the supply circuit, and a second coil located in the portable unit and coupled to convey energy to the charging circuit, the first and second coils forming an inductive coupling after placement of the portable unit in the rack;
   wherein, if the rack control circuit does not receive said message from the portable unit after receiving the signal indicative of the presence of the portable unit in the rack, the rack control circuit generates the control signal which causes the supply circuit to supply energy at the higher than normal rate.

2. An apparatus according to claim 1, wherein the portable unit has means for incorporating, in a message to be transmitted to the rack by the potable unit, a diagnosis to which a required energy transfer rate has been assigned, and wherein the rack control circuit, upon receiving the diagnosis, controls the supply circuit of the rack so as to make the supply circuit select the required energy transfer rate assigned to the diagnosis.

3. An apparatus according to claim 2, wherein if a change of the diagnosis occurs in the portable unit, the portable unit emits a message, including it new diagnosis, to the rack.

4. An apparatus according to claim 2, wherein the diagnosis is supplied by a measuring circuit which measures a state of the rechargeable battery and which determines the diagnosis according to the measured state.

5. An apparatus according to claim 4, wherein the state of the rechargeable battery is represented by a voltage of the rechargeable battery.

6. An apparatus according to claim 2, wherein the means for incorporating, in the message to be transmitted, the diagnosis of the required energy transfer rate, comprises, switching means which can be activated by a user.

7. An apparatus according to claim 1, wherein the rack control circuit monitors an amount of energy which has been transferred by the supply circuit to the portable unit placed in the rack from a time of selection of a transfer rate, and if the amount of energy which has been transferred by the supply circuit to the portable unit placed in the rack from the time of selection is greater than a predetermined amount, the rack control circuit controls the supply circuit so as to make the supply circuit select a lower energy transfer rate.

8. An apparatus according to claim 7, wherein the control circuit measures an amount of time during which energy has been transferred by the supply circuit to the portable unit at the selected transfer rate for the purpose of determining the amount of energy which has been transferred.

9. An apparatus according to claim 1, wherein the detection circuit senses the presence of the portable unit in the rack by monitoring a loading of the transfer means' inductive coupling.

10. An apparatus according to claim 1, wherein if the detection circuit does not detect the presence of the portable unit in the rack, then the control circuit controls the supply circuit so as to make the supply circuit select an energy supply rate that is lower than the higher than normal energy supply rate.

11. An apparatus according to claim 10, wherein the lower energy supply rate is lower than the normal rate.

12. An apparatus according to claim 1, wherein the supply circuit has current limiting means for limiting current through the first coil in response to the detection circuit not detecting the presence of the portable unit in the rack.

13. An apparatus according to claim 12, wherein the current limiting means further comprises a modulating circuit which is connected to the first coil and which, in accordance with a received modulation signal, modulates the current through the first coil.

14. An apparatus according to claim 1, wherein the supply circuit delivers a first alternating voltage to the first coil, the first alternating voltage having an amplitude that is proportional to a selected energy transfer rate which the control circuit has imposed on the supply circuit.

15. An apparatus according to claim 14, wherein the supply circuit has a generator and a level limiting circuit connected to the generator, and wherein further the generator delivers a second alternating voltage to the limiting circuit which limits the amplitude thereof to produce the first alternating voltage supplied to the coil of the rack, in response to the control signal received from the control circuit.

16. An apparatus according to claim 14, wherein the first and second coils are coils of respective first and second resonant circuits which are turned to a frequency of the first alternating voltage and wherein the first resonant circuit receives the first alternating voltage from the supply circuit.

17. An apparatus according to claim 14, wherein the portable unit further comprises a modulating circuit coupled to the second coil, wherein the modulating circuit comprises an electronic switch which is connected in parallel with an induction path formed by the first and second coils, the electronic switch, in accordance with a received modulating signal, alternatively conducting or not conducting for the purpose of differently loading the induction path in accordance therewith, and wherein further the charging circuit comprises means for preventing the rechargeable battery from delivering a current to the induction path, and wherein further the detection circuit monitors a loading of the induction path and delivers the signal indicative of the presence of the portable unit in the rack in accordance therewith.

* * * * *